United States Patent [19]

Hood, Jr. et al.

[11] Patent Number: 5,347,939
[45] Date of Patent: Sep. 20, 1994

[54] AGRICULTURAL APPARATUS

[75] Inventors: Clarence E. Hood, Jr., Clemson; Charles R. Dubose, Westminster, both of S.C.

[73] Assignee: Clemson University, Clemson, S.C.

[21] Appl. No.: 961,163

[22] Filed: Oct. 14, 1992

[51] Int. Cl.$^5$ ........................ A01B 59/043; A01C 7/18
[52] U.S. Cl. ........................ 111/36; 111/70; 172/451; 172/106; 172/677; 172/776
[58] Field of Search ............... 172/105, 106, 521, 439, 172/451, 677, 679, 680, 776, 310, 324, 326, 382, 395, 47, 669, 674, 675; 111/149, 139, 140, 163, 167, 194, 63, 36, 64, 65, 74, 52, 170

[56] References Cited

U.S. PATENT DOCUMENTS

| | | | |
|---|---|---|---|
| 3,093,394 | 6/1963 | McCollum | 172/439 X |
| 3,213,698 | 10/1965 | Gandrud | 172/105 X |
| 4,073,346 | 2/1978 | Groth et al. | 172/451 X |
| 4,113,028 | 9/1978 | Glueck | 172/677 X |
| 4,117,891 | 10/1978 | Neukom | 172/105 |
| 4,196,778 | 4/1980 | Smith | 172/451 X |
| 4,259,872 | 4/1981 | Chandler | 172/106 X |
| 4,500,105 | 2/1985 | Machnee | 172/677 X |
| 4,729,435 | 3/1988 | Urich | 172/776 X |
| 5,029,650 | 7/1991 | Smit | 172/439 X |

FOREIGN PATENT DOCUMENTS 74151  4/1952  Denmark .......................... 172/451

OTHER PUBLICATIONS

Page C-17 (Stabilizer) and parts breakdown page from Bigham Brothers, Inc. brochure dated Jan. 1, 1988.
"Double–Cropping Interseeding System for Wheat, Soybeans, and Cotton" by C. E. Hood et al. from Applied Engineering in Agriculture, vol. 7, No. 5 pp. 530–536, Dec. 1991.
Seeder Coulter, Model 2977, Set–Up and Parts Manual, Yetter Manufacturing Company, Colchester, Illinois, No. 2565–304, Aug. 1991.
The Tye Company Series V Pasture Pleasers Brochure No. 1170 R/3 dated Sep. 1992.

*Primary Examiner*—Clifford D. Crowder
*Assistant Examiner*—Paul C. Lewis
*Attorney, Agent, or Firm*—Dority & Manning

[57] ABSTRACT

Improved agricultural apparatus including a three-point hitch frame for attaching to a vehicle and to a tool bar assembly. Three-point hitch frame includes L-shaped retaining members for engaging the tool bar assembly and may be substantially U-shaped. The invention is also embodied in an agricultural apparatus with a hitch frame for attaching to a vehicle and to a tool bar assembly and including a metering hopper system attached to the upper side of the hitch frame. The invention is also embodied in an improved ground contact metering wheel assembly for maintaining contact with the ground even on uneven terrain. The present invention has particular applicability as an interseeding apparatus.

47 Claims, 11 Drawing Sheets

AGRICULTURAL APPARATUS

BACKGROUND OF THE INVENTION

The present invention relates to agricultural apparatus and, more particularly, to an improved agricultural apparatus adapted to be carried behind a vehicle such as a tractor.

The present invention has particular applicability to interseeding or intercropping wherein one crop, such as soybeans or cotton, is planted in the same field as another crop, such as wheat, prior to the harvest of the wheat. While many of the advantages of the present invention will be discussed with respect to this technology, it should be understood by one skilled in the art that the particular aspects of the present invention have applicability far beyond intercropping and, in particular, have general agricultural applicability.

In general, individual agricultural implements, such as seed openers, field cultivators, S-tines, bedding equipment and the like, are mounted on individual frames or tool bars with hitch means such as three-point hitch connectors attached by welding or the like to the particular tool bars. With respect to intercropping and otherwise, the particular tools that a farmer may desire to utilize with respect to an activity may vary depending on such things as soil and weather conditions. For example, depending on the soil conditions, a farmer may desire to use one type seed opener for crop planting as opposed to a different type seed opener, for example, a double disk seed opener versus an S-tine opener apparatus. It may even be desirable to switch back and forth in different parts of a single field.

In the past, it has been necessary for the farmer to replace the entire implement to shift from one application to another such as described above. Such an exercise requires increased equipment cost to the farmer in that he must maintain the various complete implements for the needed conditions as well as additional labor time if it is necessary to transfer a seed hopper or the like from one piece of equipment to another.

In addition, in known metered hopper systems where seed, fertilizer or the like is dispensed at a metered rate by use of a ground contact drive wheel, situations arise in which the assembly to which such ground drive wheel is attached will be raised above the ground a sufficient amount so that the drive contact wheel loses contact with the earth. Such could occur, for example, when a seed coulter rides up on a raised portion of the ground. Of course when this happens, the metering hopper is not driven because it is not in contact with the ground and it ceases to meter, with resultant loss in planting or distribution of fertilizer or the like.

SUMMARY OF THE INVENTION

The present invention recognizes and addresses the foregoing disadvantages, and others of prior art constructions and methods.

Accordingly, it is an object of the present invention to provide an improved agricultural apparatus for utilizing various tool bar assemblies.

It is another object of the present invention to provide an improved three-point hitch frame for quick interchange with multiple tool bar assemblies.

It is another object of the present invention to provide an improved agricultural apparatus for dispensing agricultural particulate that allows use of multiple outlet devices without removal of the particulate dispensing hopper.

It is another object of the present invention to provide a removable hitch frame assembly that can quickly and easily engage with various tool bars conveying multiple components.

It is another object of the present invention to provide an agricultural particulate dispensing system that allows for various implements to be used therewith without removal of the dispensing hopper from the system.

It is another object of the present invention to provide an improved ground contact drive wheel assembly for a metering hopper system.

It is a further object of the present invention to provide an improved ground contact drive wheel assembly for a metering hopper system that maintains contact with the ground even on uneven terrain.

It is another object of the present invention to provide an improved interseeding apparatus.

It is a further object of the present invention to provide an improved safety and transport stand for supporting a tool bar assembly with components thereon when not is use.

These and other objects are accomplished by providing an improved agricultural apparatus, the apparatus comprising a three-point hitch frame with a front and rear end, the hitch frame including means for attaching to a vehicle and means for retaining a tool bar assembly. The means for retaining a tool bar assembly includes a plurality of L-shaped retaining members. The improved agricultural apparatus further includes a removable tool bar assembly carrying tools of a particular configuration adapted to be retained on the hitch frame, the tool bar assembly including front and rear tool bar members connected by cross support members, the front and rear tool bar members being adapted to be retained by the means for retaining whereby the hitch frame can be disengaged from the tool bar assembly and other tool bar assemblies carrying varying configurations of tools can be engaged.

The three-point hitch frame may be substantially U-shaped and include first and second longitudinally extending members connected at one end by a transverse member and the plurality of L-shaped retaining members may include at least two retaining members located on each longitudinally extending member and extending therebelow for engagement with the tool bar assembly.

These and other objects may also be accomplished by providing an improved agricultural apparatus comprising a hitch frame with an upper side and a lower side, the hitch frame including means for attaching to a vehicle and means for retaining a tool bar assembly. The apparatus further including a metering hopper system attached to the upper side of the hitch frame, the metering hopper system including means for conveying agricultural particulate to a particulate outlet device. The apparatus further including a removable tool bar assembly adapted to be retained on the lower side of the hitch frame by the means for retaining, the tool bar assembly supporting a ground contact metering drive wheel assembly for controlling the rate of agricultural particulate dispensed by the metering hopper system. The apparatus further including at least one particulate outlet device supported on the tool bar assembly and adapted to apply the particulate to the ground, whereby the hitch frame can be disengaged from the tool bar assembly and engaged with other tool bar assemblies carrying different configurations of particulate outlet devices without removal of the metering hopper system.

These and other objects are also accomplished by providing an improved ground contact drive wheel assembly for a metering hopper system with a metering drive shaft, the drive wheel assembly comprising a ground contact wheel, means for supporting the ground contact wheel on a tool bar, means for adjusting the vertical height of the ground contact wheel with respect to the tool bar, means for transmitting the rotation of the ground contact wheel to rotate the metering drive shaft, and means for preventing the ground contact wheel from losing contact with the ground when traversing uneven terrain.

While the invention has particular applicability to interseeding or intercropping, it should be understood by one skilled in the art that the aspects set forth in the present invention have general agricultural applicability including use of a variety of implements in both tilled and no till applications.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
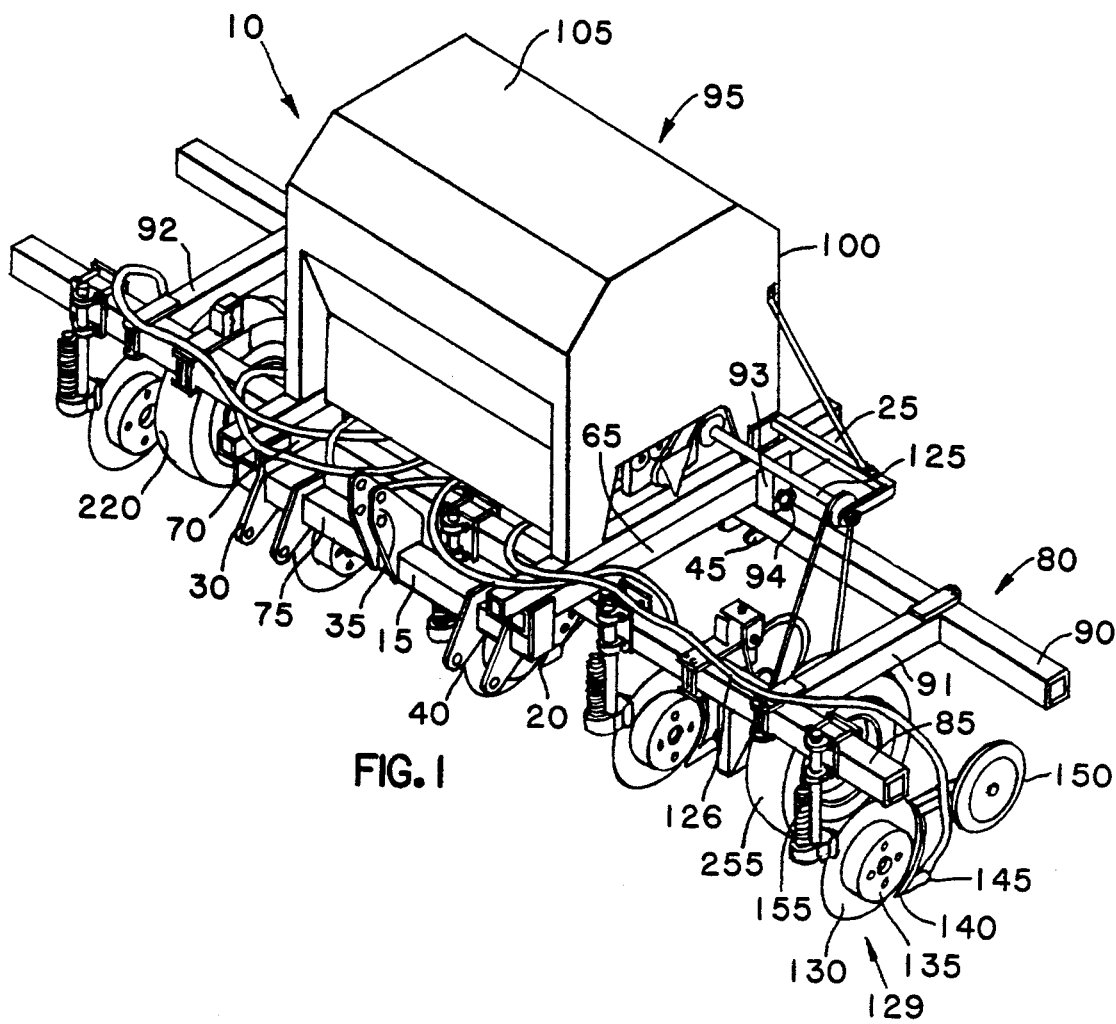
FIG. 1 is a perspective view of an improved agricultural apparatus in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Referring to FIG. 1, an improved agricultural apparatus in accordance with the present invention is generally illustrated at 10 and includes a three-point hitch frame 15 with a front end 20 and a rear end 25. Located on the front of three-point hitch frame 15 are means for attaching to a vehicle. As embodied herein, the means for attaching to a vehicle include three-point hitch attachment points illustrated at 30, 35 and 40. It should be appreciated by one skilled in the art that the vehicle referred to herein will generally be in the form of a tractor, but may be any type of vehicle such as, for example, a grain combine (with header removed) or other vehicle for carrying the three-point hitch frame.

Three-point hitch frame 15 also includes means for retaining a tool bar assembly. As embodied herein, the means for retaining a tool bar assembly includes a plurality of L-shaped retaining members 45, 50, 55 and 60 (see FIGS. 1, 2 and 14). Three-point hitch frame 15 is preferably substantially U-shaped or fork-shaped with a first longitudinal member 65 and a second longitudinal member 70 connected by a transverse member 75. Three-point hitch frame 15 has an upper side and lower side which are as would be conventionally represented as upper and lower in the orientation of FIG. 1. L-shaped retaining members 45, 50, 55 and 60 are spaced on the first and second longitudinally extended members, 65 and 70, in amounts substantially equal to the spacing between the front and rear tool bars of the tool bar assembly as will be discussed in more detail below.

Figure 2:
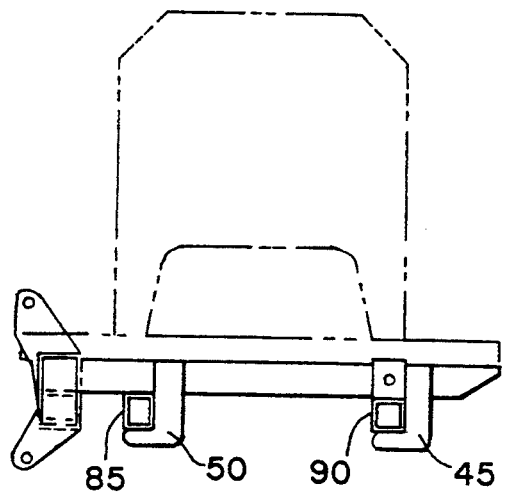
FIG. 2 is a side view of various components of an embodiment of the improved agricultural apparatus illustrating connection of the hitch frame to the tool bar assembly.
Figure 3:
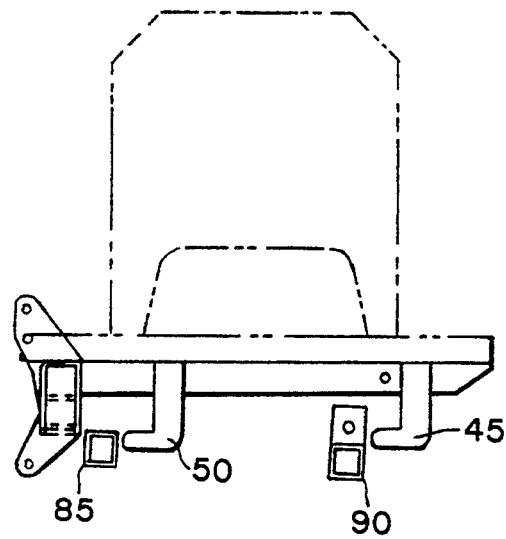
FIG. 3 illustrates the hitch bar retaining mechanism immediately before or after engagement with the tool bar assembly.

Referring to FIGS. 1–3, a tool bar assembly 80 is generally illustrated including a front tool bar member 85 and a rear tool bar member 90 connected by cross support members 91 and 92. Tool bar assembly 80 is adapted to have various implements or tools attached thereto depending on the agricultural activity which is to be accomplished with the particular configuration. As best illustrated in FIGS. 2 and 3, L-shaped retaining members 45, 50, 55 and 60 are attached to three-point hitch frame 15 and oriented with respect thereto to form hooks for being slidingly received on front and rear tool bar members 85 and 90.

FIG. 2 illustrates L-shaped retaining members 45 and 50 engaging the back and bottom portions of front and rear tool bar members 85 and 90 to maintain the tool bar assembly securely engaged by the three-point hitch frame. FIG. 3 illustrates three-point hitch frame 15 being moved rearward with respect to tool bar assembly 80 so that L-shaped retaining members 45 and 50 disengage the tool bar assembly and can then be moved to engage another tool bar assembly with a different configuration of tools.

Figure 5:
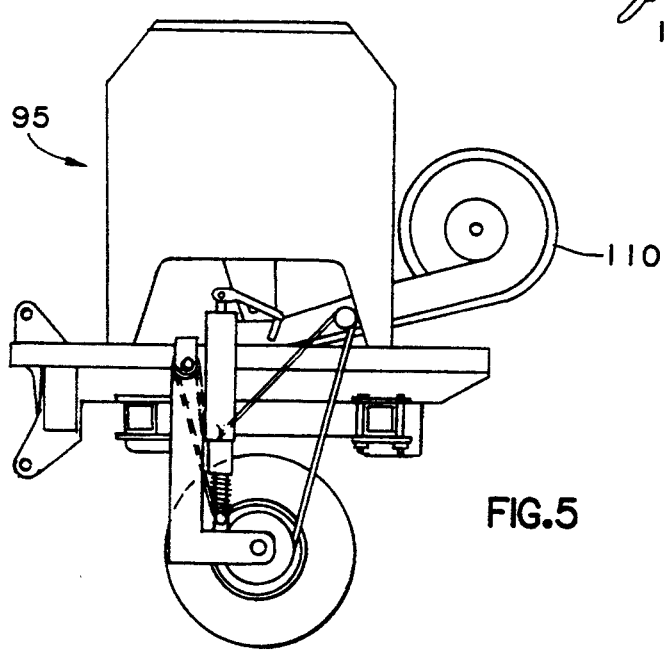
FIG. 5 is an elevational view of the present invention illustrating one embodiment of a ground contact drive wheel assembly utilized with a metering hopper system.
Figure 13:
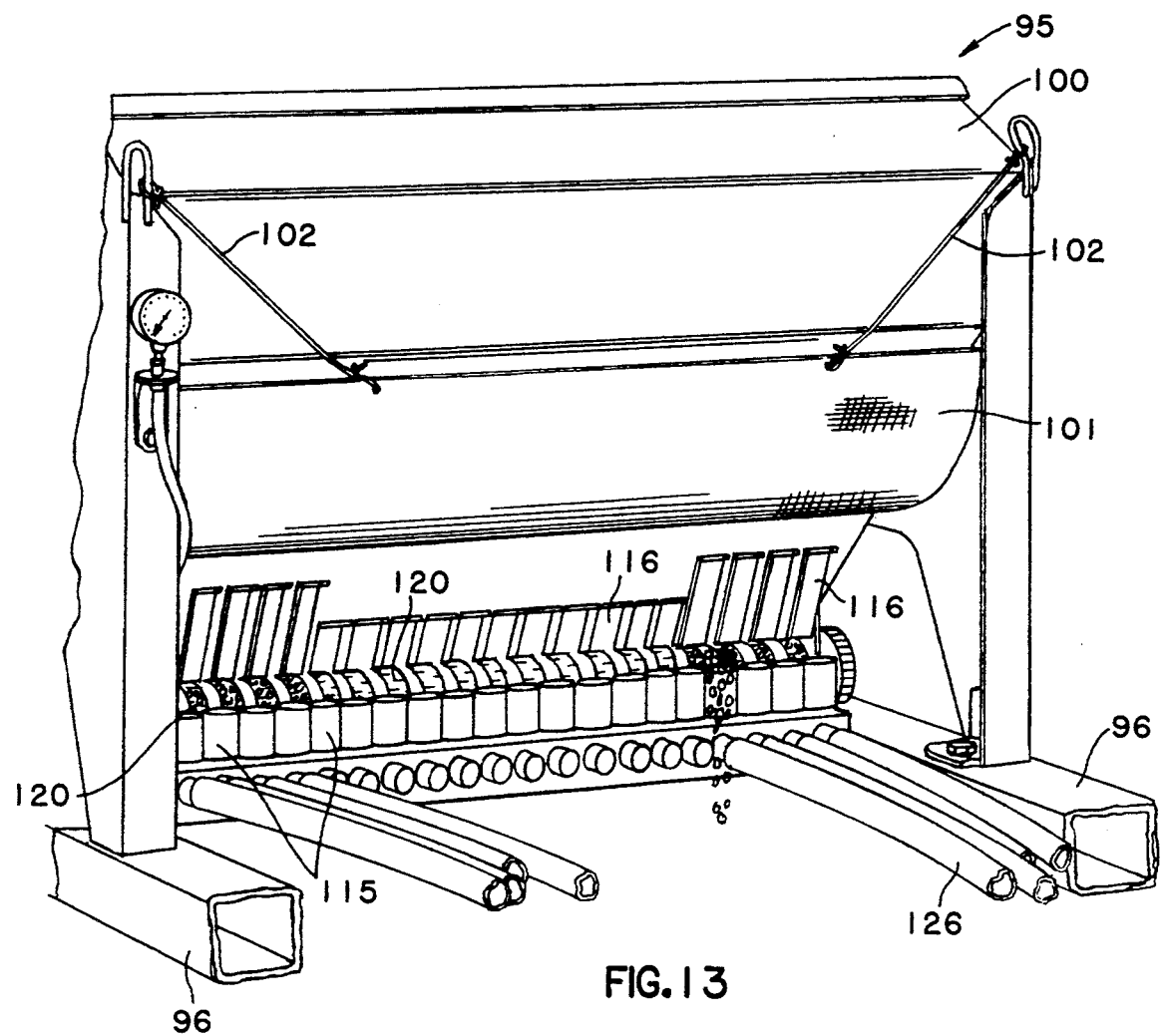
FIG. 13 is a perspective view of a metering hopper system in accordance with an embodiment of the present invention, as would be seen by the operator of a vehicle carrying the present invention.

Referring to FIGS. 1 and 13, a metering hopper system 95 may be attached to the upper side of hitch frame 15. This attachment may be by clamps or any other securing means between hitch frame 15 and hopper support members 96. Metering hopper system 95 includes means for conveying agricultural particulate to a particulate outlet device. As embodied herein and best illustrated in FIGS. 1, 5 and 13, metering hopper system 95 includes a hopper 100 with an inlet access for placing the particulate in the hopper illustrated at 105. As best illustrated in FIGS. 5 and 13, metering hopper system 95 includes a hydraulically driven air blower 110 and a plurality of particulate receiving chambers 115 whereby particulate falls from hopper 100 into chambers 115 at a metered rate determined by gear type metering wheels 120. Metering wheels 120 are mounted on a metering wheel drive shaft with sprocket illustrated in FIG. 1 at 125 for controlling the rate of rotation of the metering wheels 120 which controls the amount of particulate that is allowed to be sent to the particulate outlet devices. A variable speed transmission is located between shaft 125 and particulate metering wheels 120. Hopper 100 has a rain flap 101 that covers the entrance to the particulate delivery tubes. This rain flap may be retained out of the way by cords 102 so that the particulate can be monitored by the vehicle operator. Also a clear plastic cover could be used for visual monitoring while still providing protection from the rain. Further, a pressure gauge is mounted on the side of the hopper 100 so the tractor operator can monitor the blower. Blower speed is controlled by the hydraulics on the tractor.

In operation, particulate moves from hopper 100 into chambers 115 where it is mixed with air from blower 110 and propelled by through tubes 126 for delivery to one or more particulate outlet devices. Each gear type metering wheel 120 may be isolated from the particulate by way of a sliding opening cover 116 located between the gear and the hopper. It should be understood by one skilled in the art that agricultural particulate as discussed herein refers to seed, granular chemicals such as herbicides, fertilizer, or any like agricultural particulate. It should also be appreciated by one skilled in the art that the particulate metering hopper system illustrated in the drawings and described is by way of example only, and any metering hopper system suitable to the particular application desired by the user could be utilized. In this regard, a preferred metering hopper system to be utilized is that manufactured by Gandy and known and designated as Gandy Air Applicator, Model No. OA6216C, S with 16 particulate outlets. Such is by way of illustration only and in no way is intended to limit application of various metering hopper systems in the present invention.

Referring to FIG. 1, an embodiment of a particulate outlet device that could be utilized in accordance with the present invention is illustrated. A seed opening device 129 is illustrated that includes a coulter disk wheel 130 with a gauge wheel or band 135 for controlling the depth of cut of the disk wheel. Seed opening device 129 also includes a knife 140 and a seed dispensing element 145 integral with the knife. Metering hopper system 95 dispenses seed or other agricultural particulate through hoses 126 to element 145 to be laid in or on the ground depending on the application. As further illustrated in FIG. 1, a press wheel 150 follows along behind the seed dispensing element 145 for the purpose of pressing the dirt back down. The particular seed opening device illustrated in FIG. 1 includes an extended shaft mounting 155 to allow the tool bar to be operated at a substantial distance above the ground. In a preferred embodiment, a seed opening device such as the Yetter Seed Coulter, Model 2977, manufactured by the Yetter Manufacturing Company in Colchester, Ill., may be utilized. Of course, this is by way of example only and is not intended to limit the scope of the present invention.

Figure 4:
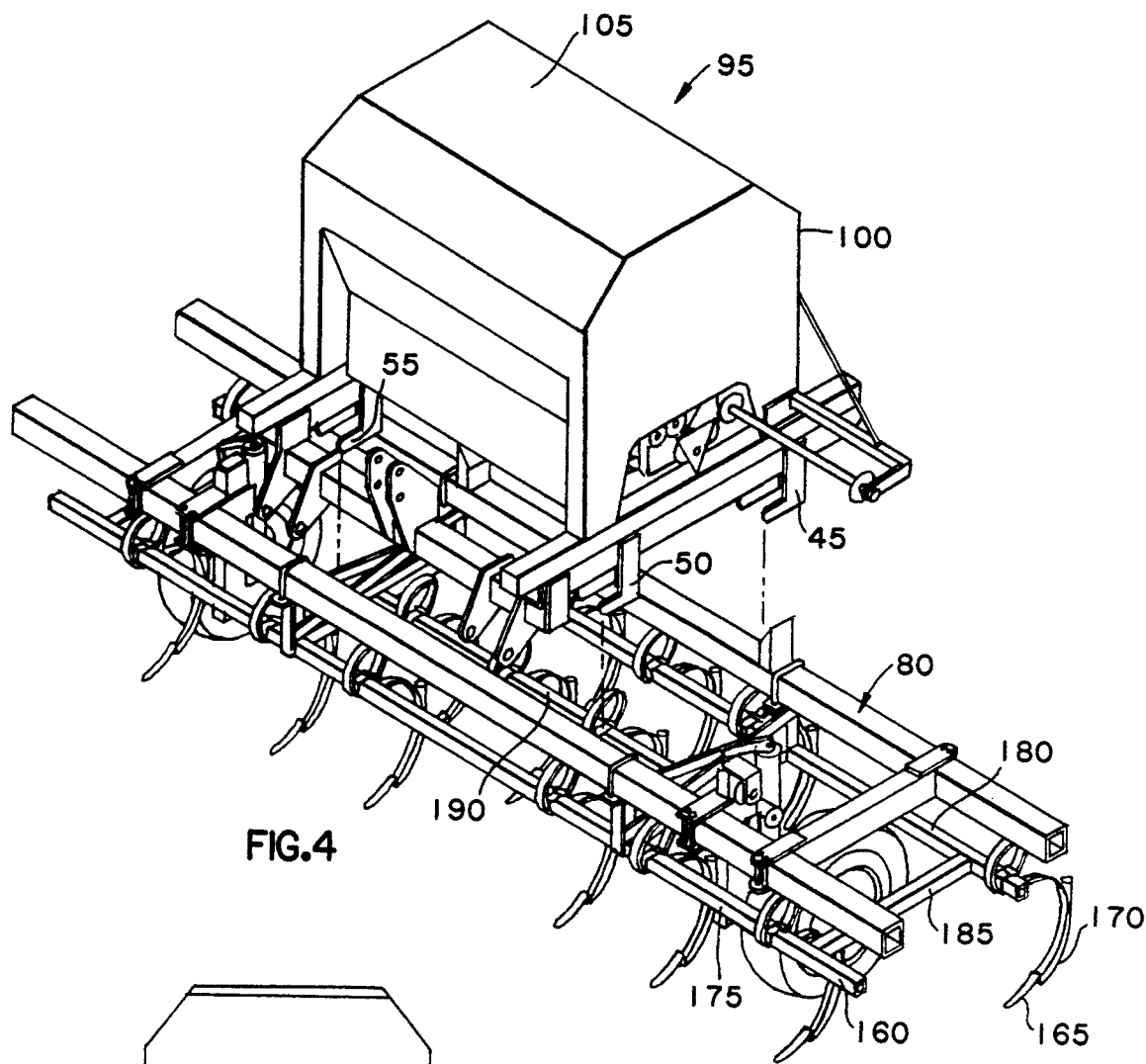
FIG. 4 is a perspective view of an embodiment of the present invention with a subframe below the tool bar carrying an alternate particulate outlet device.

Referring to FIG. 4, a tool bar subframe 160 is illustrated for carrying a variety of types and configurations of tools. Tool bar subframe 160 may be attached to tool bar assembly 80 at any desired location by clamps or other securement means and may carry alternate forms of seed opening devices or other particulate outlet devices as would be desirable. FIG. 4 illustrates tool bar subframe assembly 160 carrying a plurality of S-tines 165 with seed delivery openings 170 adapted to be connected to hoses 126 for the purpose of delivering and planting seed thereat.

It should be appreciated by one skilled in the art that tool bar subframe assembly 160 could be of any desired configuration and attached in any known manner, as well as carry a variety of tool devices as would be desirable. In the particular configuration illustrated in FIG. 4, a front subframe member 175 is attached to a rear subframe member 180 by cross members 185. An intermediate subframe member 190 is disclosed extending parallel to and between front and rear subframe members 175 and 180 but extending only a portion of the length of such members so that appropriate wheels can be placed between the front and rear members 175 and 180 as illustrated in FIG. 4. Such arrangement provides the advantages of allowing a desirable configuration of S-tines 165 be applied to the subframe without interfering with the depth control and metering wheels as illustrated in FIG. 4.

Figure 6:
FIG. 6 illustrates a field that has been intercropped with wheat and soybeans.
Figure 7:
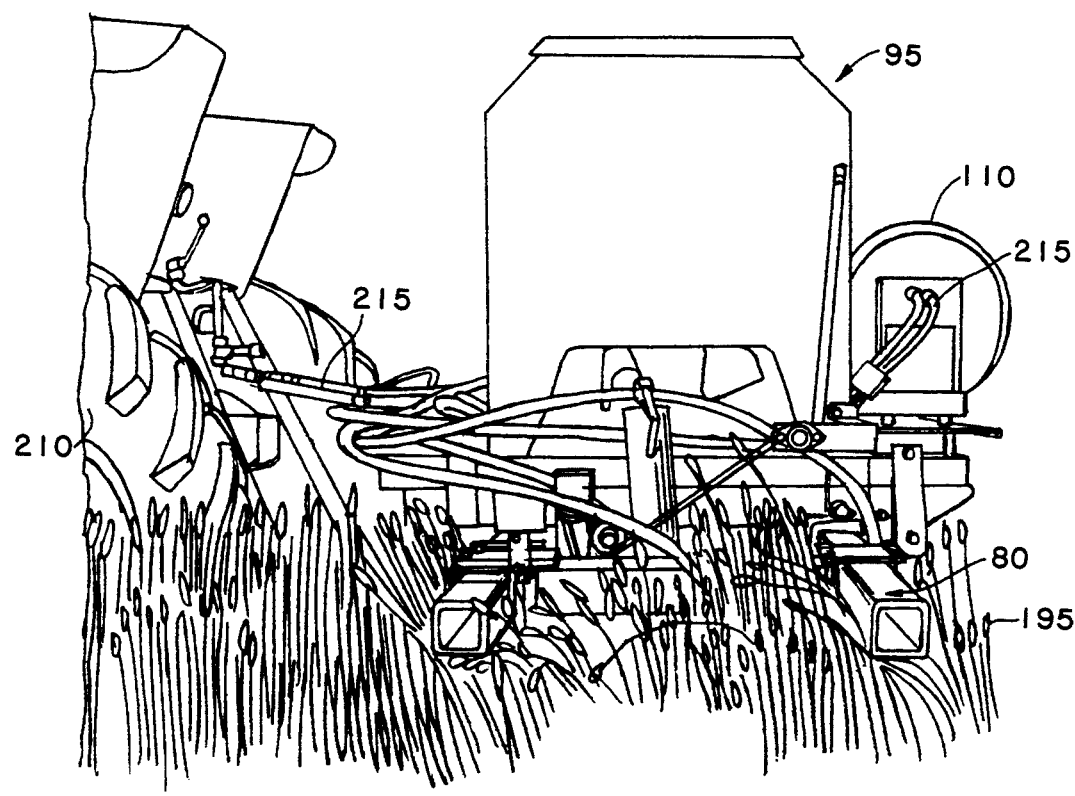
FIG. 7 illustrates an apparatus in accordance with an embodiment of the present invention being utilized in an intercropped field.
Figure 12:
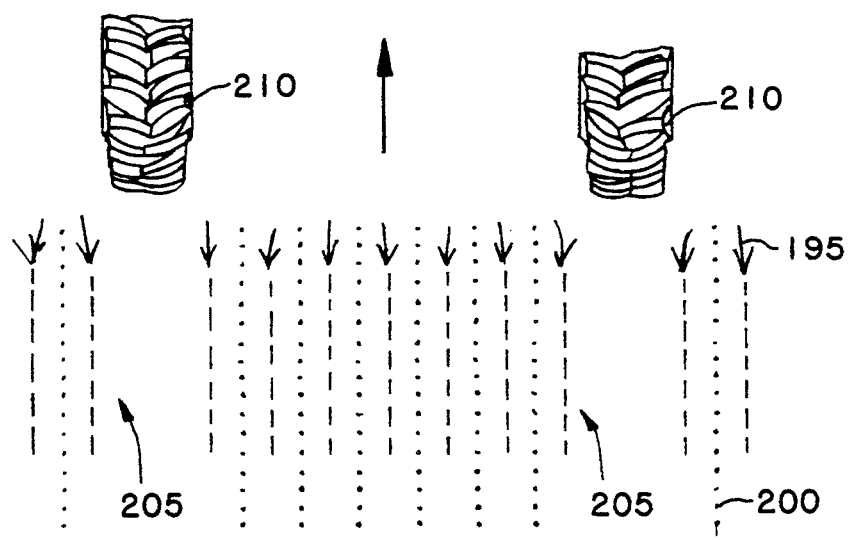
FIG. 12 is a schematic view illustrating one planting pattern for intercropping.

As discussed above, the present invention has particular applicability because of its flexibility to interseeding. FIG. 6 illustrates a portion of a field that has been planted by the method of interseeding. As illustrated in FIG. 6, wheat 195 in rows is growing with rows of soybeans, cotton or the like 200 planted therebetween. In such an arrangement, when the wheat is harvested, the soybeans will already have begun to grow. Such an interseeding method provides numerous advantages such as reduced soil erosion, reduced soil compaction in planting and harvesting, reduced time necessary from the farmer, reduced energy input, and improved weed control. FIG. 7 illustrates an apparatus in accordance with one embodiment of the present invention being utilized in an interseeded field. As can be seen, tool bar assembly 80 can be located by the height control wheels discussed below at a sufficient height so as not to damage the wheat growing in the field. In addition, the various implements and wheels can be arranged on the tool bar assemblies 80 or tool bar subframes 160 for varying applications of spacing of rows and wheel paths. Referring to FIG. 12, one interseeding planting pattern is set forth in which wheat 195 is planted with soybeans 200 planted therebetween in a particular row pattern and with wheel paths 205 located therein to allow for movement of tractor wheels 210 or other so aligned implement wheels. Numerous interseeding methods can be utilized and the present invention adapted thereto by simple movement of components. The particular orientation of FIG. 1 provides additional advantages for interseeding in that the coulter can cut through trash or grain or other debris in the rows and can be mounted on a high clearance tool bar to prevent damage to the growing wheat.

Figure 20:
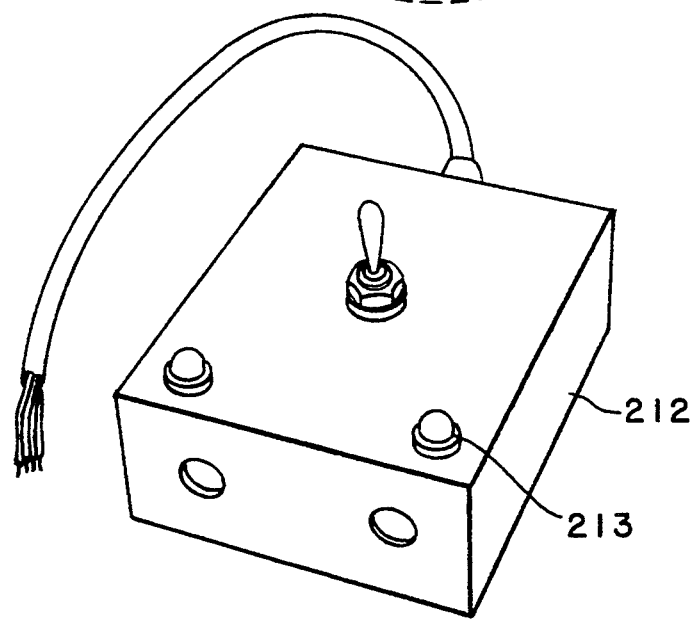
FIG. 20 is a perspective view of the control box in accordance with an embodiment of the present invention.

Referring again to FIG. 7, hydraulic hoses 215 are illustrated for providing drive to blower 110 for providing the air for the particulate metering hopper system 95 illustrated in this embodiment of the present invention. In addition, referring to FIG. 20, a control box 212 with indicator lights 213 is provided for indicating blower 110 is operating and for controlling the electric clutch that is located within metering hopper system 95.

Figure 19:
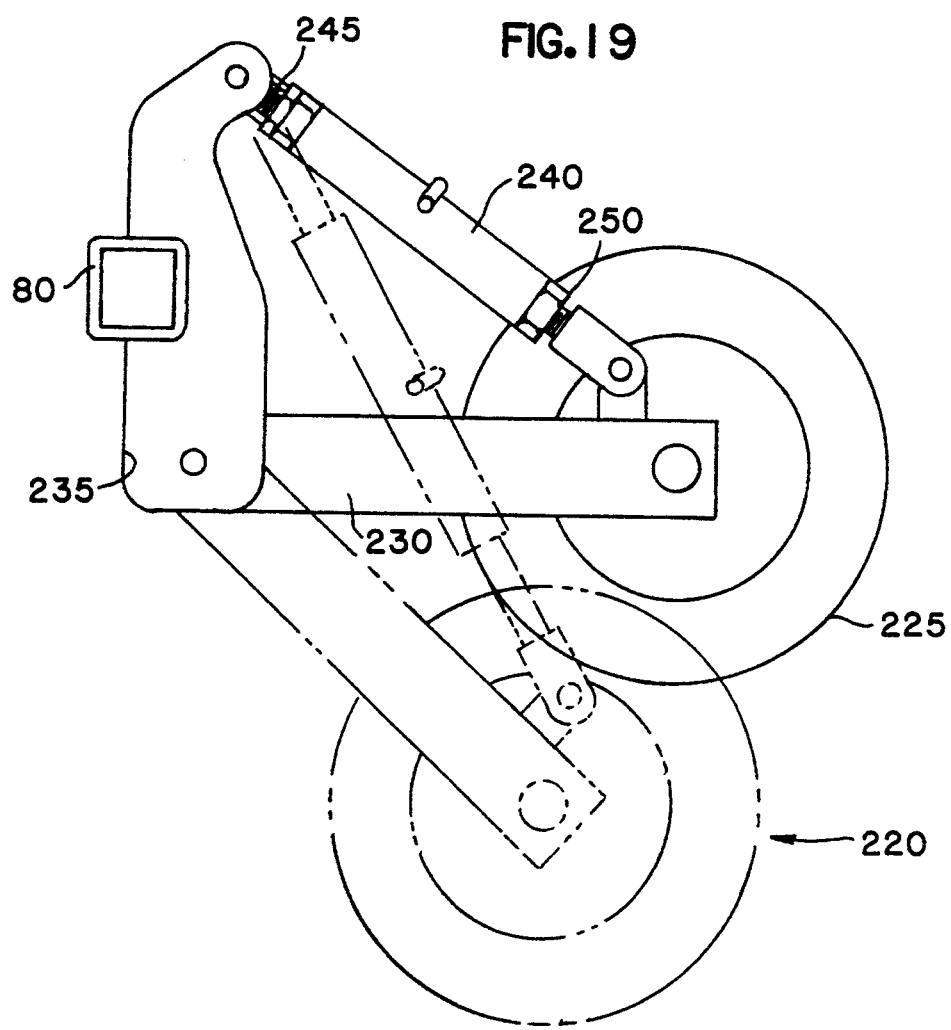
FIG. 19 is an elevational view of a non-metering vertical adjustment wheel for the tool bar assembly in accordance with the present invention.

Referring to FIGS. 1 and 19, a height adjustment or leveling wheel assembly 220 is illustrated. Referring specifically to FIG. 19, a wheel 225 is connected to a wheel support member 230 which is attached to a support bracket 235 which is, in turn, attached to tool bar assembly 80. The attachment to tool bar assembly 80 may be on front tool bar member 85 or rear tool bar member 90. Assembly 220 further includes a vertical adjustment member 240 with threaded adjustment portions 245 and 250, portion 245 being connected to the upper portion of support member 235, and portion 250 being connected to arm 230. To set the depth or vertical position of one side of the tool bar, vertical adjustment member 240 can be extended or retracted so as to hold wheel 225 and tool bar assembly 80 at a particular desired spaced relation.

Referring again to FIG. 1, a ground contact metering drive wheel assembly is generally illustrated at 255. This metering drive wheel assembly 255 may be attached to front tool bar member 85 or rear tool bar member 90 and at any desired location along either such tool bar.

Figure 8:
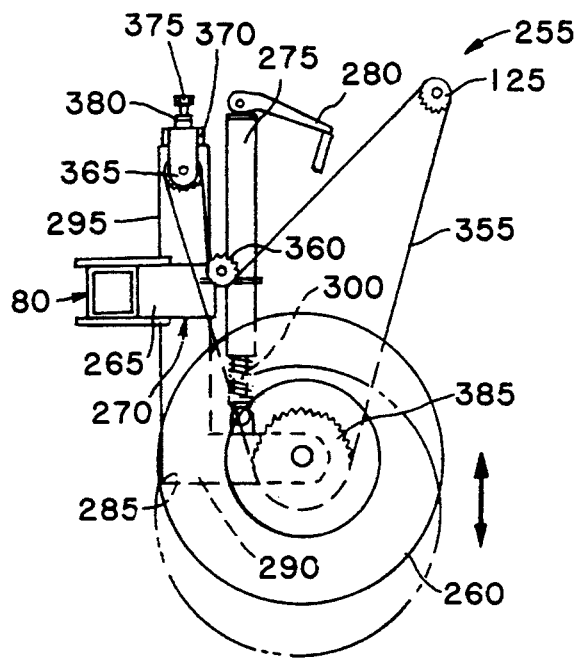
FIG. 8 is an elevational view illustrating vertical movement of one embodiment of the ground contact drive wheel assembly.
Figure 9:
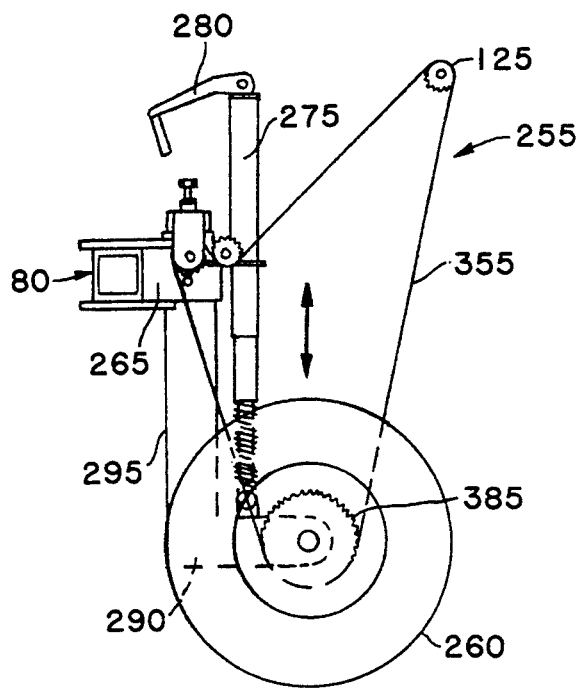
FIG. 9 is an elevational view illustrating opposite vertical movement of the embodiment of FIG. 8.
Figure 10:
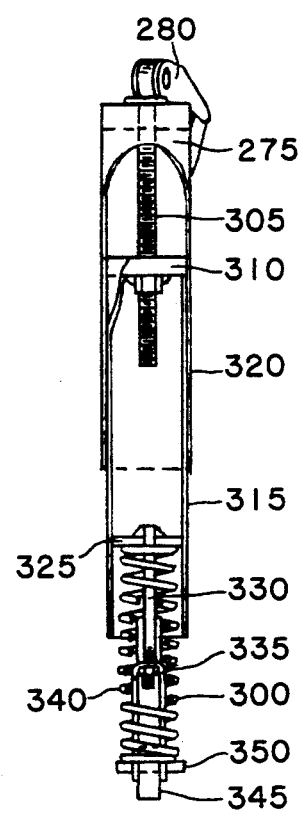
FIG. 10 is a perspective view with parts broken away of a screwjack compression spring mechanism in accordance with an embodiment of the present invention.

One embodiment of ground contact metering wheel assembly 255 is illustrated in more detail in FIGS. 8–10. As best illustrated in FIGS. 8 and 9, ground contact metering drive wheel assembly 255 includes a ground contact wheel 260. Metering drive wheel assembly 255 further includes means for supporting ground contact wheel 260 on tool bar assembly 80. As embodied herein, this means for supporting includes a support bracket 265 which forms a sleeve 270 therethrough. Drive wheel assembly 255 further includes means for adjusting the vertical height of ground contact wheel 260. As embodied herein, the means for adjusting the vertical height includes a screwjack 275 with jack handle 280. Screwjack 275 is connected between support bracket 265 and the means for preventing the ground control wheel from losing contact with the ground.

As embodied herein, the means for preventing the ground control wheel 260 from losing contact with the ground includes an L-shaped wheel support member 285 with a first leg 290 and a second leg 295. In addition, the means for preventing ground contact wheel from losing contact includes a compression spring 300. Screwjack 275 is connected between support 265 and first leg 290.

FIG. 10 illustrates in more detail the particular operation of the screwjack 275 and compression spring 300. As illustrated in FIG. 10, screwjack 275 includes an internally threaded screw 305 and a plate 310 welded to the top of an inner tube 315. The screwjack 275 also includes an outer tube 320. As illustrated in FIG. 10, screwjack 275 and compression spring 300 are incorporated into a single unitary device. Inner tube 315 includes an interior support member 325 welded to the interior of inner tube 315 and a threaded shaft 330 with a yoke 335 attached to a nut 340. This assembly further includes a stud 345 and pin 350 with stud 345 being connected to first leg 290.

In operation, screwjack handle 280 is rotated to cause inner tube 315 to move with respect to outer tube 320 and therefore set the vertical height of the screwjack. Second leg 295 telescopes within sleeve 270 to allow wheel 260 to move up and down with the movement of the screwjack. Compression spring 300 provides a preset load on wheel 260 so that as wheel 260 is moving along the ground, if the tool bar is lifted off the ground, wheel 260 will move down to maintain contact with the ground and therefore continue to drive the metering hopper system. This movement is illustrated in FIG. 8 in broken lines. In addition, vertical adjustment is illustrated in FIG. 9 with the inner tube 315 being moved further out of the outer tube 320 than in FIG. 8.

In addition, in this embodiment, there is provided a chain drive system with chain 355 for transmitting rotation of wheel 260 to sprocket 125 as will be described below in detail. Further, there is provided means for maintaining tension on chain 355 substantially constant as wheel 260 is vertically adjusted. As embodied herein, the means for maintaining tension on the chain include an idler sprocket 360 connected to support bracket 265 and a second idler sprocket 365 connected to a tube 370 that telescopes with leg 295. Screw means 375 are provided with internal nut 380 to provide movement of idler sprocket 365 with respect to leg 295 and thus provide fine tension adjustment on chain 355 as desired. As is apparent from FIGS. 8 and 9, as wheel 260 is moved along the ground, it is caused to rotate which rotates sprocket 385 which, in turn, causes sprocket 125 of the metering hopper system shaft to rotate and control the movement of metering wheels 120 (illustrated in FIG. 13) in accordance with the speed of the vehicle. Such transmission of rotation between wheel 260 and sprocket 125 is accomplished through chain 355 extending over idler sprockets 360 and 365. Of course, it should be appreciated by one skilled in the art that any equivalent transmission system could be utilized, such as, for example, a belt or other endless means drive in place of a chain.

Figure 11:
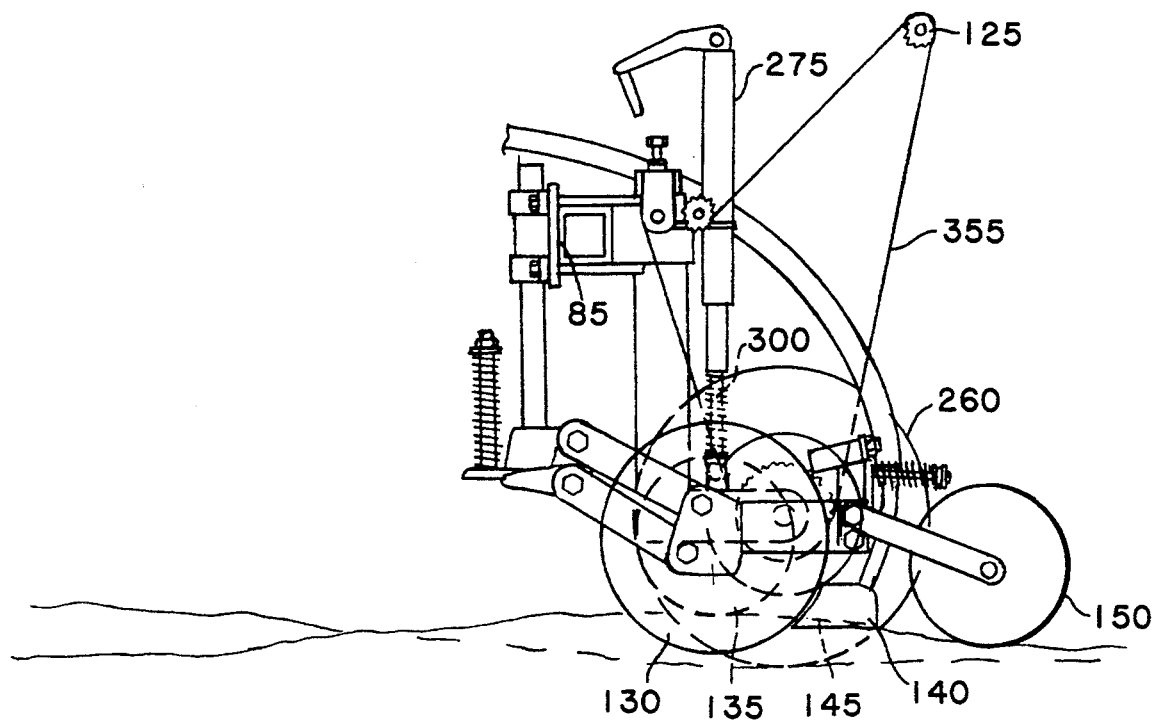
FIG. 11 is an elevational view illustrating the relationship between various aspects of the apparatus in use on uneven terrain.

Referring to FIG. 11, the embodiment of the present invention illustrated in FIG. 1 is shown with respect to uneven terrain. FIG. 11 illustrates coulter disk wheel 130 with gauge wheel or band 135 and knife 140 which is adapted to dispense agricultural particulate or seeds at 145. In addition, a press wheel 150 is illustrated for pressing down the earth after the seed in implanted therein. Screwjack mechanism 275 and drive wheel 260 are also illustrated as well as transmission chain 355 and sprocket 125. As can be seen, the seed opener device illustrated in FIG. 11 as well as the ground contact metering drive wheel assembly 255 are attached to front tool bar member 85. As uneven terrain is encountered, gauge wheel or band 135, which is designed to control the depth of cut of the coulter disk wheel 130 rides up on the ground and causes the tool bar assembly 80 to be moved up away from the ground. FIG. 11 illustrates how, in accordance with the present invention, compression spring 300 forces wheel 260 down as tool bar assembly 80 is lifted so that wheel 260 maintains contact with the ground where a static wheel support assembly would cause wheel 260 to be lifted off the ground. Therefore, in accordance with the present invention, the ground contact metering drive wheel assembly will maintain contact with the ground and therefore continue to meter the agricultural particulate out of the hopper whereas it would otherwise be out of contact with the ground and cease to operate.

Figure 15:
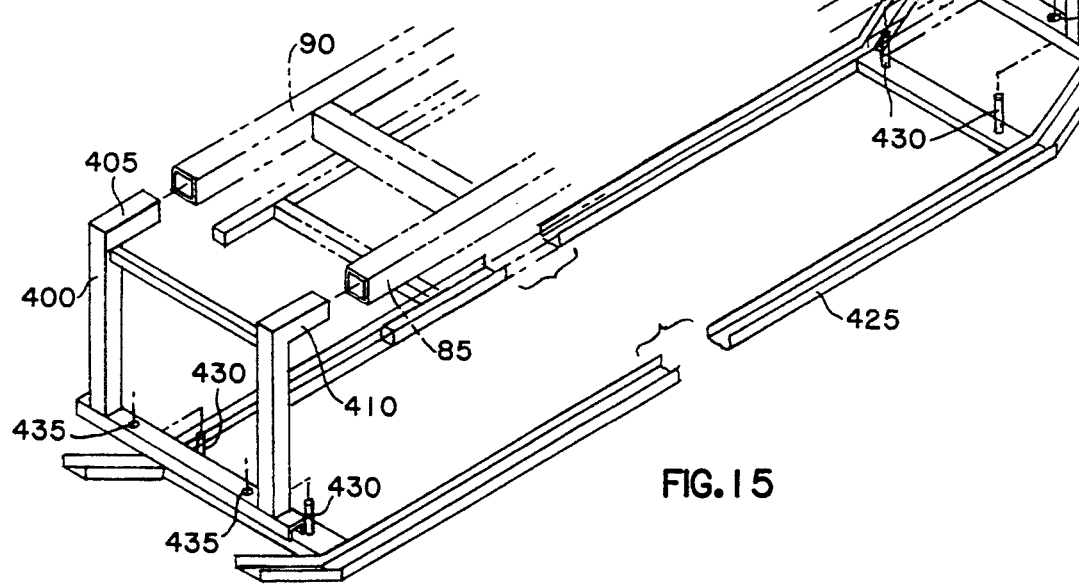
FIG. 15 illustrates a safety and transport stand for use in accordance with the present invention.

Referring to FIG. 15, a safety and transport stand assembly is generally illustrated at 390. Stand assembly 390 includes a first stand end 395 and a second stand end 400. Stand end 395 and stand end 400 include portions 405, 410, 415 and 420 that telescope into the hollow ends of front and rear tool bar members 85 and 90. This can be accomplished while the three-point hitch frame 15 and tool bar assembly 80 is still connected to the tractor or vehicle and lifted thereby. Once stand ends 395 and 400 are inserted into tool bar members 85 and 90, the assembly may be lowered onto base 425 which includes alignment studs 430. Alignment studs 430 are adapted to align with receipt holes 435 in stand ends 395 and 400. When pins 430 are received in holes 435, suitable retaining means such as lynch pins may be inserted through studs 430 for the purpose of maintaining the structure together. With this configuration, the vehicle can move the entire assembly around, the entire assembly can be safely stored on the ground, or the hitch frame assembly can be removed from the tool bar assembly with the tool bar and implements being maintained a suitable orientation for storage. This safety and transport stand assembly 390 assists with transporting tool bar mounted agricultural apparatus without damaging components as well as readily providing a means of winching the entire apparatus onto a tilted trailer or the like.

Figure 16:
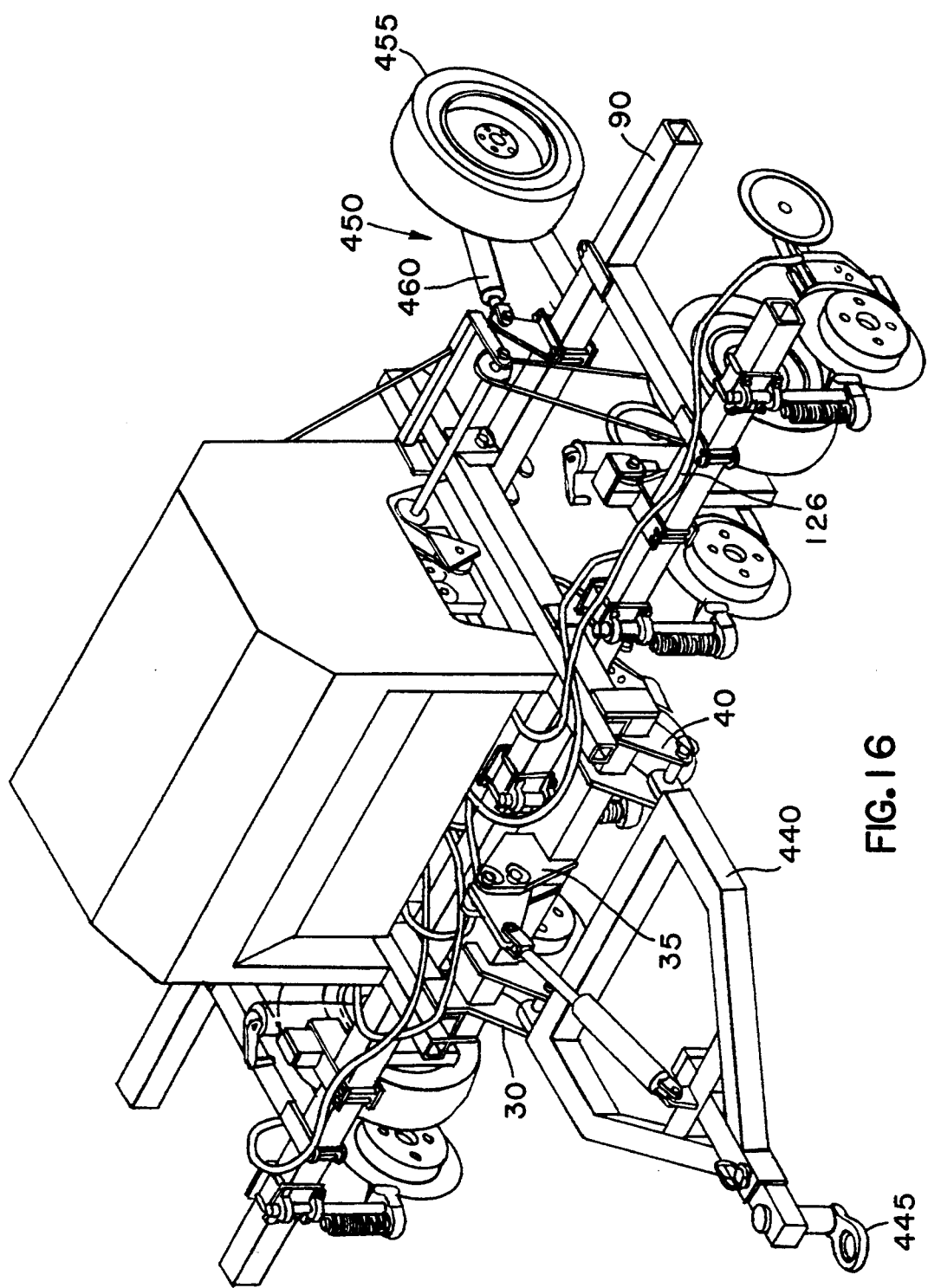
FIG. 16 illustrates an alternate embodiment of the present invention that is adapted to be towed as a trailer.
Figure 17:
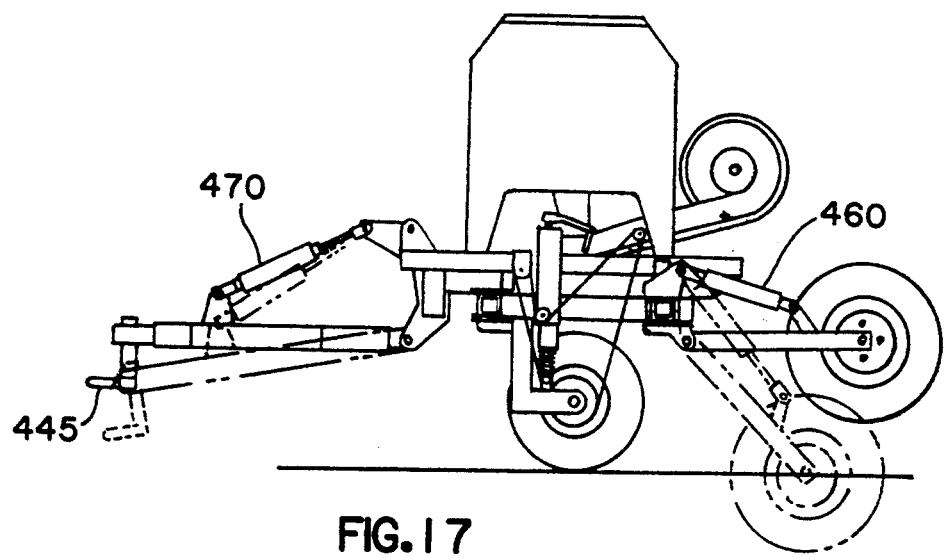
FIG. 17 is an elevational view of the apparatus of FIG. 16 illustrating lifting of the apparatus by the hydraulic wheel and trailer assemblies.

Referring to FIG. 16, an alternate embodiment of the present invention is disclosed wherein a swivel hitch adapter 440 is provided with a swivel hitch 445. Swivel hitch adapter 440 includes a three-point connection for attaching to the three-point hitch frame at 30, 35 and 40 and a swivel hitch 445 for attaching to a vehicle. This embodiment also includes at least one hydraulically actuated wheel assembly 450 which is mounted to tool bar member 90 and includes a wheel 455 and lift cylinder 460. As illustrated in FIG. 17, swivel hitch 445 may be attached to a vehicle and the entire assembly moved through the field in trailer form rather than with its entire weight being supported on the vehicle. This may be desirable when the weight of the apparatus becomes such as to unbalance the assembly when attached to a vehicle such as a tractor. As illustrated in FIG. 17, hydraulic cylinders 460 and 470 may be actuated to cause tool bar assembly with the attached hitch frame to be lifted off the ground for transport or the like.

Figure 18:
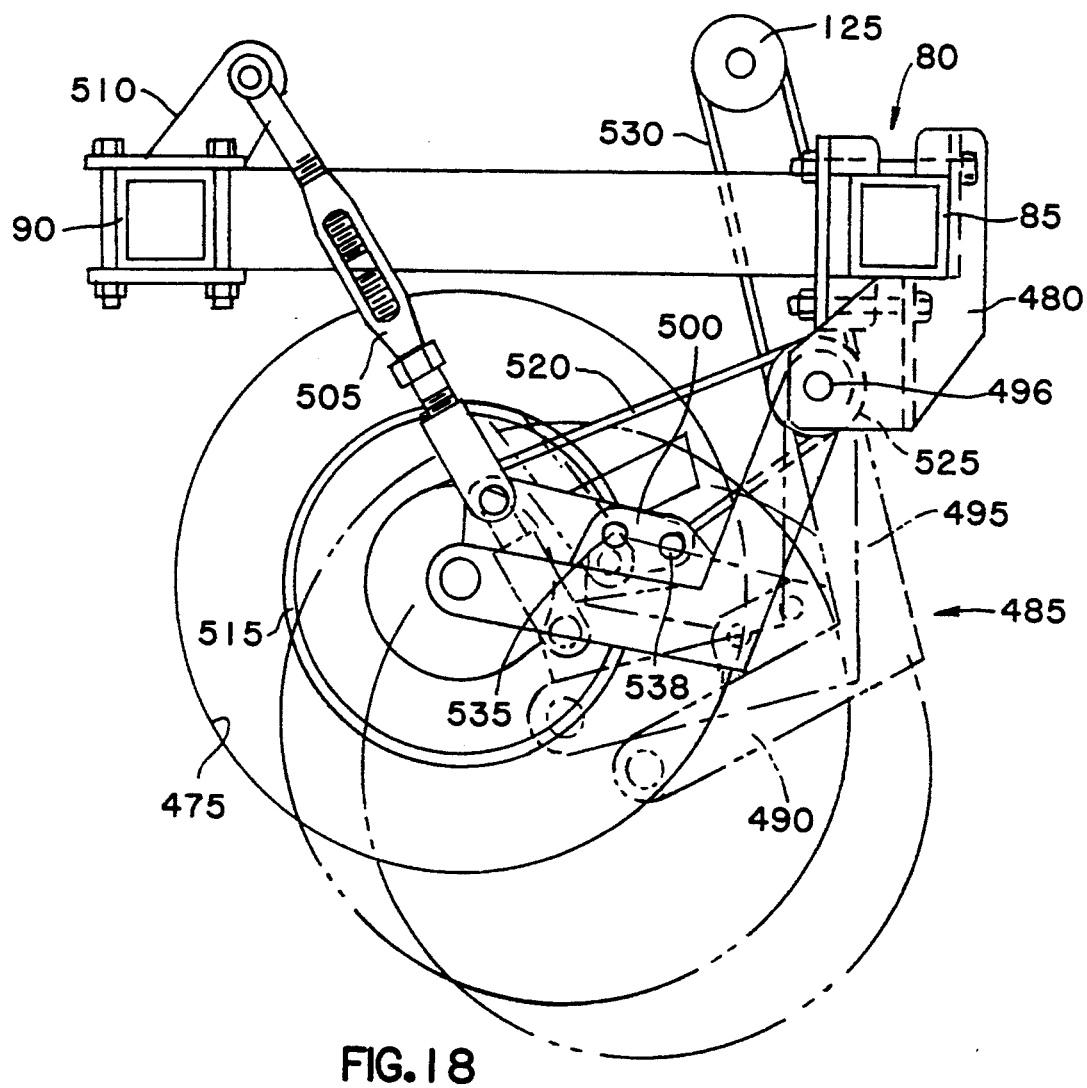
FIG. 18 is an elevational view of a ground contact drive wheel assembly in accordance with an alternate embodiment of the present invention.

Referring to FIG. 18, an alternate embodiment of the ground contact metering drive wheel assembly 255 is illustrated. As illustrated in FIG. 18, the ground contact drive wheel assembly includes means for supporting ground contact wheel on a tool bar. As embodied herein, ground contact wheel 475 is connected through a linkage assembly to a support bracket 480 which is connected to tool bar assembly 80. The ground contact wheel further includes means for preventing the ground contact wheel from losing contact with the ground. As embodied herein, the means for preventing ground contact wheel from losing contact includes an L-shaped wheel support member 485 which includes a first leg 490 and a second leg 495. First leg 490 is connected through a spindle to ground contact wheel 475 and second leg 495 is pivotally connected to support bracket 480 at pivot 496. A first linkage member 500 is illustrated pivotally connected to first leg member 490 on one end and pivotally connected to the means for adjusting the vertical height on the other end. As embodied herein, the means for adjusting the vertical height includes an adjustable linkage 505 which is connected through a second support bracket 510 to tool bar assembly 80. Ground contact wheel 475 includes a sprocket 515 which is connected through chain or belt member 520 to sprocket 525. Sprocket 525 is, in turn, connected to sprocket 125 through a second drive chain or belt 530. A locking pin hole 535 is provided for locking the linkage that allows movement of the wheel to conform to uneven terrain. In this embodiment, member 505 can be adjusted to set the vertical height of the ground wheel 475 at a desirable level. When uneven terrain is encountered, L-shaped wheel support member 485 pivots about pivot 496 and first linkage member 500 pivots about pivot point 538 thus moving as illustrated in broken lines in FIG. 18 and providing conformity with uneven terrain.

Figure 21:
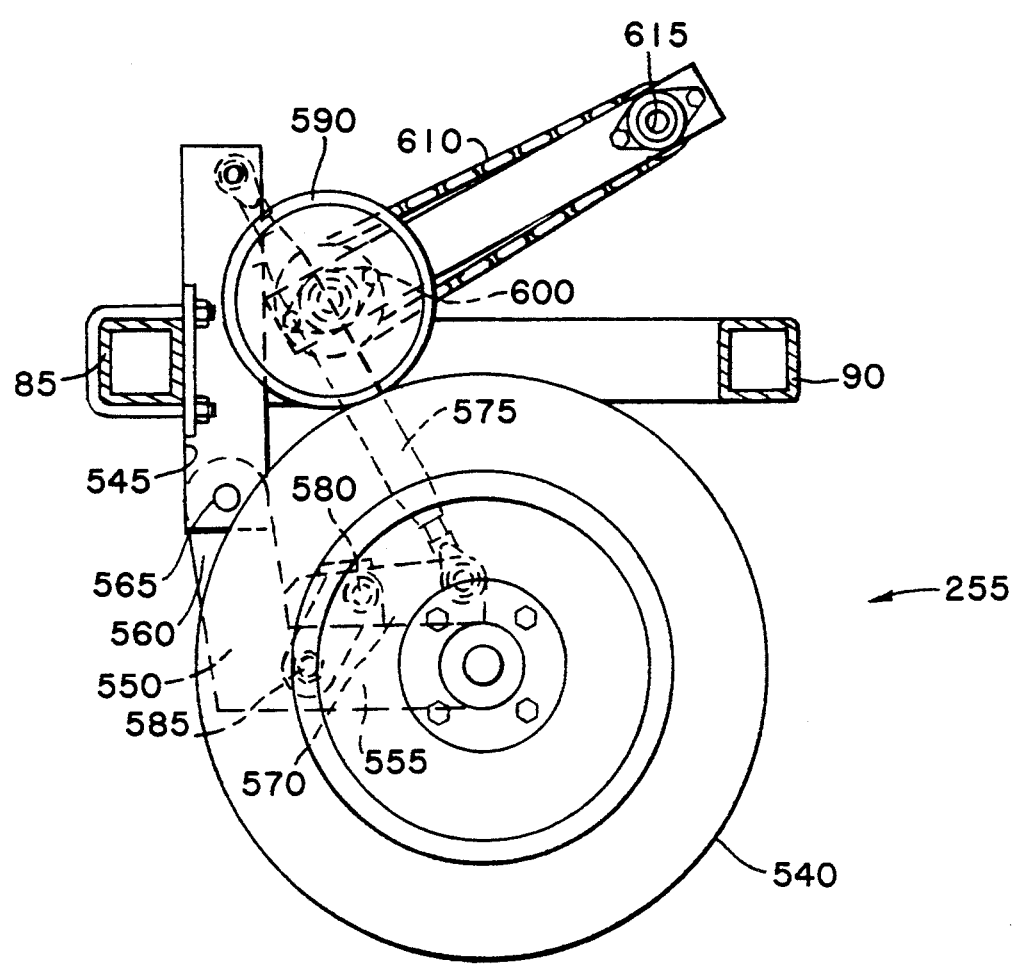
FIG. 21 is another alternate embodiment of the improved ground contact drive wheel assembly in accordance with the present invention.

Referring to FIG. 21, a further embodiment of the ground contact drive wheel assembly 255 is illustrated. As illustrated in FIG. 21, the ground contact drive wheel assembly 255 includes means for supporting ground contact on a tool bar. As embodied, ground contact wheel 540 is connected through a linkage assembly to a support bracket 545 which is connected to tool bar assembly 80. The ground contact wheel further includes means for preventing the ground contact wheel from losing contact with the ground. As embodied herein, the means for preventing the ground contact wheel from losing contact includes an L-shaped wheel support member 550 which includes a first leg 555 and a second leg 560. First leg 555 is connected through a spindle to ground contact wheel 540 and second leg 560 is pivotally connected to support bracket 545 at pivot 565. A linkage member 570 is illustrated pivotally connected to first leg member 555 on one end and pivotally connected to the means for adjusting the vertical height on the other end. While adjustable linkage 575 is illustrated as a double screw mechanism, it should be appreciated that any form of adjustable linkage member could be utilized such as, for example, a hydraulic cylinder or the like. As embodied herein, the means for adjusting the vertical height includes an adjustable linkage 575 which is pivotally connected to linkage member 570 on one end and to support bracket 545 on the other end. A locking pin hole 580 is provided for locking the linkage that allows movement of wheel 540 to conform to uneven terrain. A locking pin may be inserted in hole 580 and through a portion of apparatus for preventing the pivoting of linkage member 570 if so desired.

In this embodiment, member 575 can be adjusted to set the vertical height of ground wheel 540 at a desirable level. When uneven terrain is encountered, L-shaped wheel support member 550 pivots about pivot point 565 and linkage member 570 pivots about pivot point 585 to allow wheel 540 to drop down and conform to the uneven terrain.

In the embodiment illustrated in FIG. 21, the means for transmitting the rotation of the ground contact wheel to rotate the metering drive shaft includes a surface contact drive wheel 590 which is connected through a spindle 600 to a pivotal support arm 605 which is, in turn, pivotally attached to a portion of the apparatus at any suitable place above the tool bar assembly. Surface contact drive wheel 590 contacts the surface of ground contact wheel 540 and is driven when ground contact wheel 540 rotates. A chain and sprocket mechanism 610 is connected between wheel 590 and a shaft 615 which either is the same as shaft 125 or connected thereto for rotation through a transmission arrangement. As can be seen, in this embodiment, when the hitch frame 15 with metering hopper system 95 is removed from a tool bar carrying metering wheel assembly 255, since wheel 590 is in surface contact with wheel 540, no disconnection of the transmission chains or the like is required. This allows for easy changing of tool bar assemblies and easy reestablishment of the transmission between the wheel 540 and the shaft and sprocket 125. In addition, when wheel 540 moves up and down, wheel 590 will automatically and be maintained in contact therewith by gravity.

With reference to FIGS. 1-4, the process of changing tool bar assemblies 80 with respect to hitch frame 15 is described. Starting with three-point hitch frame 15 attached to the tractor and tool bar assembly 80 with tool bars 85 and 90 secured in safety stand 390 as illustrated in FIG. 15. Initially, the transmission means is disconnected between the metering wheel drive shaft with sprocket 125 and the ground contact metering drive wheel assembly 255. In the embodiments of FIGS. 1, 8, 16 and 18, this is accomplished by removing the chain or belt drive between these components. In the embodiment of FIG. 21, since wheel 590 is a surface driven wheel, it is not necessary to make any disconnection of this transmission means. When embodied as a particulate dispensing apparatus, the next step would be to disengage tubes 126 from the appropriate particulate dispensing outlet devices. The operator then backs the tractor to the safety stand until the four pairs of L-shaped retainers 45, 50, 55 and 60 clear tool bars 85 and 90 when lifted as shown in FIGS. 2 and 3. Once the three-point hitch of the tractor is raised, the tractor can be driven forward since it is disconnected from the tool bar assembly. It should be noted that the hydraulic lines 215 (FIG. 7) that power the blower and the electrical control lines do not have to be disconnected in the above-described procedure.

Figure 14:
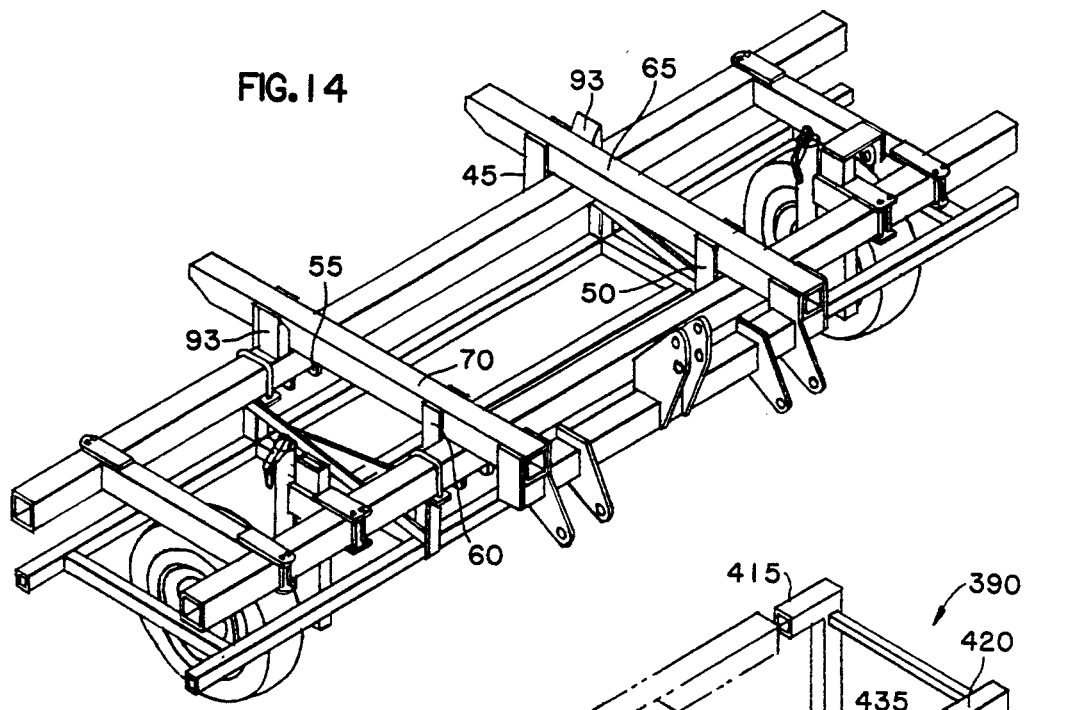
FIG. 14 is a perspective view of a hitch frame, tool bar and subframe in accordance with an embodiment of the present invention.

To reconnect to another tool bar assembly, the operator backs and guides the three-point hitch assembly 15 over the top of tool bars 85 and 90. The top link of the tractor three-point hitch and the side lift links can be manually adjusted if there is a need to level assembly 15 relative to the tool bar assembly before engagement. Once the tractor is backed to the point where the tips of the L-shaped retainers can clear the tool bars, frame 15 is lowered as shown in FIG. 4. The rounded surfaces on the tips of L-shaped retainers 45, 50, 55 and 60 assist with guiding the retainers under the tool bars 85 and 90. Studs 93, as illustrated in FIGS. 1 and 14, serve to guide hitch frame 15 to the appropriate location. Once the operator drives forward, locking between retainers 45, 50, 55 and 60 and tool bars 85 and 90 is completed. Safety pins 94, as illustrated in FIG. 1, may be utilized to extend through guide studs 93 into hitch frame 15 for an added measure of safety.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

We claim:

1. An agricultural apparatus, said apparatus comprising:
    a) a three-point hitch frame with a front end and a rear end, said hitch frame including means for attaching to a vehicle and means for removably retaining a tool bar assembly, said means for retaining a tool bar assembly including a plurality of L-shaped retaining members respectively defining an opening directed toward said means for attaching to a vehicle; and
    b) a removable tool bar assembly structurally independent of said three-point hitch frame, said tool bar assembly including front and rear tool bar members connected by cross support members including an integral portion configured to be bar members including an integral portion configured to be received within respective openings of said plurality of L-shaped retaining members, whereby said hitch frame can be disengaged from said tool bar assembly and other tool bar assemblies carrying varying configurations of tools can be engaged.

2. An agricultural apparatus as in claim 1, wherein said three-point hitch frame is substantially U-shaped and includes first and second longitudinally extending members connected at one end by a transverse member.

3. An agricultural apparatus as in claim 2, wherein said plurality of L-shaped retaining members includes at least two L-shaped retaining members located on each said longitudinally extending member and extending therebelow for engagement with said tool bar assembly.

4. An agricultural apparatus as in claim 3, wherein said L-shaped retaining members are spaced on said first and second longitudinally extending members an amount substantially equal to the spacing between the front and rear tool bar members so that when said three-point hitch frame is moved into contact with said tool bar assembly, each tool bar member will be engaged by respective L-shaped retaining members.

5. An agricultural apparatus as in claim 3, wherein said front and rear tool bar members comprise rectangular tubing.

6. An agricultural apparatus as in claim 1, wherein said rear tool bar member has guide stubs extending thereabove to guide the hitch frame into contact with said tool bar assembly.

7. An agricultural apparatus as in claim 1, wherein said three-point hitch frame includes a swivel hitch adapter assembly and said tool bar assembly includes at least one hydraulically actuated wheel assembly so that said apparatus can be towed behind a vehicle as a trailer and said tool bar raised and lowered by operation of said at least one hydraulically actuated wheel assembly.

8. An agricultural apparatus as in claim 1, and further including a tool bar subframe mounted substantially beneath said tool bar assembly and carrying a plurality of agricultural implements thereon.

9. An agricultural apparatus, said apparatus comprising:
   a) a three-point hitch frame with a front end and a rear end, said hitch frame including means for attaching to a vehicle and means for removably retaining a tool bar assembly, said means for retaining a tool bar assembly including a plurality of L-shaped retaining members; and
   b) a removable tool bar assembly structurally independent of said three-point hitch frame, said tool bar assembly including front and rear tool bar members connected by cross support members, said front and rear tool bar members configured to engage said L-shaped retaining members and be retained whereby said hitch frame can be disengaged from said tool bar assembly and other tool bar assemblies carrying varying configurations of tools can be engaged; and
   c) a metering hopper system mounted on said hitch frame and further wherein said tool bar assembly includes a ground contact drive wheel assembly mounted thereon for controlling the rate of agricultural particulate dispensed by said metering hopper system.

10. An agricultural apparatus, said apparatus comprising:
   a) a three-point hitch frame with a front end and a rear end, said hitch frame including means for attaching to a vehicle and means for removably retaining a tool bar assembly, said means for retaining a tool bar assembly including a plurality of L-shaped retaining members; and
   b) a removable tool bar assembly structurally independent of said three-point hitch frame, said tool bar assembly including front and rear tool bar members connected by cross support members, said front and rear tool bar members configured to engage said L-shaped retaining members and be retained whereby said hitch frame can be disengaged from said tool bar assembly and other tool bar assemblies carrying varying configurations of tools can be engaged; and
   c) a safety and transport stand assembly, said stand assembly including first and second stand ends for mating with said tool bar assembly, and further including a separate base portion, said stand ends and said base portion including mating means for maintaining engagement thereof and being sufficiently spaced when assembled so as to provide a protective structure about the tool bar assembly.

11. An agricultural apparatus, said apparatus comprising:
   a) a hitch frame with an upper side and a lower side, said hitch frame including means for attaching to a vehicle and means for retaining a tool bar assembly;
   b) a metering hopper system attached to the upper side of said hitch frame, said metering hopper system including means for conveying agricultural particulate to a particulate outlet device;
   c) a removable tool bar assembly adapted to be retained on the lower side of said hitch frame by said means for retaining, said tool bar assembly supporting a ground contact metering drive wheel assembly for controlling the rate of agricultural particulate dispensed by said metering hopper system; and
   d) at least one particulate outlet device supported on said tool bar assembly and adapted to apply the particulate to the ground, whereby said hitch frame can be disengaged from said tool bar assembly and engaged with other tool bar assemblies carrying different configurations of particulate outlet devices without removal of the metering hopper system.

12. An agricultural apparatus as in claim 11, wherein said means for retaining a tool bar assembly includes a plurality of L-shaped retaining members.

13. An agricultural apparatus as set forth in claim 11, wherein said hitch frame is substantially U-shaped and includes first and second longitudinally extending members connected at one end by a transverse member.

14. An agricultural apparatus as set forth in claim 12, wherein said plurality of L-shaped retaining members includes at least two L-shaped retaining members located on each said longitudinally extending member and extending therebelow for engagement with said tool bar assembly.

15. An agricultural apparatus as set forth in claim 11, wherein said means for attaching to a vehicle includes connections for a three-point hitch.

16. An agricultural apparatus as set forth in claim 11, wherein said agricultural particulate is seed.

17. An agricultural apparatus as set forth in claim 11, wherein said agricultural particulate is granular chemicals.

18. An agricultural apparatus as set forth in claim 11, wherein said agricultural particulate is fertilizer.

19. An agricultural apparatus as set forth in claim 11, wherein said at least one particulate outlet device includes a seed opener device.

20. An agricultural apparatus as set forth in claim 19, wherein said seed opener device includes a disk coulter, a knife and a press wheel for placing the agricultural particulate in the ground.

21. An agricultural apparatus as in claim 11, wherein said ground contact metering drive wheel assembly includes
   a ground contact wheel;
   means for supporting said ground contact wheel on a tool bar;
   means for adjusting the vertical height of said ground contact wheel with respect to said tool bar;
   means for transmitting the rotation of said ground contact wheel to rotate a metering drive shaft on said metering hopper system; and
   means for preventing said ground contact wheel from losing contact with the ground when traversing uneven terrain.

22. An agricultural apparatus as in claim 21, wherein said means for supporting said ground contact wheel on said tool bar includes a support bracket connected to said tool bar and wherein said means for adjusting the vertical height of said ground contact wheel includes a screwjack connected between said support bracket and said means for preventing the ground contact wheel from losing contact with the ground.

23. An agricultural apparatus as in claim 21, wherein said means for supporting said ground contact wheel on said tool bar includes a support bracket connected to said tool bar, said support bracket forming a sleeve therethrough; and wherein said means for preventing said ground contact wheel from losing contact with the ground includes an L-shaped wheel support member including a first and second leg, said first leg being connected to said ground contact wheel and said second leg extending through said support bracket sleeve for vertical movement therethrough, and a compression spring located between said support bracket and said first leg for biasing said wheel against the ground to prevent it from losing contact with the ground on uneven terrain.

24. An agricultural apparatus as in claim 23, wherein said means for adjusting the vertical height of said ground contact wheel includes a screwjack connected between said support bracket and said first leg.

25. An agricultural apparatus as in claim 24, wherein said screwjack and said compression spring are a unitary device.

26. An agricultural apparatus as in claim 21, wherein said means for transmitting the rotation of said ground contact wheel to rotate said metering shaft includes a chain and sprocket arrangement.

27. An agricultural apparatus as in claim 26, wherein said means for transmitting includes means for maintaining the tension on said chain substantially constant as said drive wheel is vertically adjusted.

28. An agricultural apparatus as in claim 27, wherein said means for maintaining the tension substantially constant includes an idler sprocket attached to said support bracket and an idler sprocket attached to second leg of said L-shaped wheel support member.

29. An agricultural apparatus as in claim 28 and further includes means for fine adjustment of the tension of said chain.

30. An agricultural apparatus as in claim 21, wherein said means for supporting said ground contact wheel on a tool bar includes a support bracket mounted to the tool bar.

31. An agricultural apparatus as in claim 30, wherein said means for preventing said ground contact wheel from losing contact with the ground includes an L-shaped wheel support member including a first leg and a second leg, said first leg being connected to said ground contact wheel and said second leg being pivotally connected to said support bracket, and further including a first linkage member pivotally connected to said first leg on one end and pivotally connected to the means for adjusting the vertical height on the other end whereby said ground wheel can pivot down to compensate for uneven terrain if the ground causes the tool bar to be lifted.

32. An agricultural apparatus as in claim 31, wherein said means for adjusting the vertical height includes an adjustable linkage member, said adjustable linkage member extending between the support bracket and the first linkage member.

33. An agricultural apparatus as in claim 31, wherein the first linkage member includes means for locking the ground wheel against downward movement.

34. An agricultural apparatus as in claim 21, wherein the means for transmitting includes a driven wheel in contact with the ground wheel and driven thereby, said driven wheel being operatively connected to said metering hopper drive shaft.

35. An agricultural apparatus as in claim 34, wherein said driven wheel is mounted to said tool bar on a pivotal arm and is maintained in contact with said ground wheel by gravity.

36. An agricultural apparatus as in claim 21, wherein the means for transmitting includes a chain and sprocket arrangement.

37. A ground contact drive wheel assembly for a metering hopper system with a metering drive shaft, said drive wheel assembly comprising:

a) a ground contact wheel;
b) means for supporting said ground contact wheel on a tool bar, wherein said means for supporting said ground contact wheel on a tool bar includes a support bracket connected to said tool bar;
c) means for adjusting the vertical height of said ground contact wheel with respect to said tool bar, wherein said means for adjusting the vertical height of said ground contact wheel includes a screwjack connected between said support bracket and said means for preventing the ground contact wheel from losing contact with the ground;
d) means for transmitting the rotation of said ground contact wheel to rotate said metering drive shaft; and
e) means for preventing said ground contact wheel from losing contact with the ground when traversing uneven terrain.

38. A ground contact drive wheel assembly for a metering hopper system with a metering drive shaft, said drive wheel assembly comprising:

a) a ground contact wheel;
b) means for supporting said ground contact wheel on a tool bar, wherein said means for supporting said ground contact wheel on a tool bar includes a support bracket connected to said tool bar, said support bracket forming a sleeve therethrough;
c) means for adjusting the vertical height of said ground contact wheel with respect to said tool bar;
d) means for transmitting the rotation of said ground contact wheel to rotate said metering drive shaft; and
e) means for preventing said ground contact wheel from losing contact with the ground when traversing uneven terrain, wherein said means for preventing said ground contact wheel from losing contact with the ground includes an L-shaped wheel support member including a first and second leg, said first leg being connected to said ground contact wheel and said second leg extending through said support bracket sleeve for vertical movement therethrough, and a compression spring located between said support bracket and said first leg for biasing said wheel against the ground to prevent it from losing contact with the ground on uneven terrain.

39. A ground contact drive wheel assembly as in claim 38, wherein said means for adjusting the vertical height of said ground contact wheel includes a screwjack connected between said support bracket and said first leg.

40. A ground contact drive wheel assembly as in claim 39, wherein said screwjack and said compression spring are a unitary device.

41. A ground contact drive wheel assembly as in claim 38, wherein said means for transmitting the rotation of said ground contact wheel to rotate said metering shaft includes a chain and sprocket arrangement.

42. A ground contact drive wheel assembly as in claim 41, wherein said means for transmitting includes means for maintaining the tension on said chain substantially constant as said drive wheel is vertically adjusted.

43. A ground contact drive wheel assembly as in claim 42, wherein said means for maintaining the tension substantially constant includes an idler sprocket attached to said support bracket and an idler sprocket attached to second leg of said L-shaped wheel support member.

44. A ground contact drive wheel assembly as in claim 43 and further includes means for fine adjustment of the tension of said chain.

45. A ground contact drive wheel assembly for a metering hopper system with a metering drive shaft, said drive wheel assembly comprising:
a) a ground contact wheel;
b) means for supporting said ground contact wheel on a tool bar, wherein said means for supporting said ground contact wheel on a tool bar includes a support bracket mounted to the tool bar;
c) means for adjusting the vertical height of said ground contact wheel with respect to said tool bar;
d) means for transmitting the rotation of said ground contact wheel to rotate said metering drive shaft; and
e) means for preventing said ground contact wheel from losing contact with the ground when traversing uneven terrain, wherein said means for preventing said ground contact wheel from losing contact with the ground includes an L-shaped wheel support member including a first leg and a second leg, said first leg being connected to said ground contact wheel and said second leg being pivotally connected to said support bracket, and further including a first linkage member pivotally connected to said first leg on one end and pivotally connected to the means for adjusting the vertical height on the other end whereby said ground wheel can pivot down to compensate for uneven terrain if the ground causes the tool bar to be lifted.

46. A ground contact drive wheel assembly as in claim 45, wherein said means for adjusting the vertical height includes an adjustable linkage member, said adjustable linkage member extending between the support bracket and the first linkage member.

47. A ground contact drive wheel assembly as in claim 45, wherein the first linkage member includes means for locking the ground wheel against downward movement.

* * * * *

UNITED STATES PATENT AND TRADEMARK OFFICE
CERTIFICATE OF CORRECTION

PATENT NO. : 5,347,939

DATED : September 20, 1994

INVENTOR(S) : Clarence E. Hood, Jr. et al.

It is certified that error appears in the above-identified patent and that said Letters Patent is hereby corrected as shown below:

In Column 11, Line 32, after the word "automatically", add the words --follow it--.

In Claim 1, Column 12, Line 35, add --,-- after the word

"members"; (second occurrence)

in line 36, delete "including an integral portion configured to be"; and beginning in Line 36, add --at least one of said front and rear tool--.

Signed and Sealed this

Ninth Day of May, 1995

Attest:

BRUCE LEHMAN

*Attesting Officer*     *Commissioner of Patents and Trademarks*